US 6,640,597 B2

(12) United States Patent
Beeck et al.

(10) Patent No.: US 6,640,597 B2
(45) Date of Patent: Nov. 4, 2003

(54) METHOD FOR REDUCING VARIANCE IN THE COOLANT CONSUMPTION OF COMPONENTS OF A TURBO-MACHINE

(75) Inventors: Alexander Beeck, Orlando, FL (US); Christoph Nagler, Zurich (CH); Mark Richter, Aarau (CH)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 10/003,231

(22) Filed: Dec. 6, 2001

(65) Prior Publication Data

US 2002/0124615 A1 Sep. 12, 2002

(30) Foreign Application Priority Data

Dec. 22, 2000 (DE) .......................................... 100 64 266

(51) Int. Cl.$^7$ ................................................. B21D 1/02
(52) U.S. Cl. ................................. 72/112; 72/75; 72/74; 29/90.01
(58) Field of Search ............................... 72/75, 112, 67, 72/74, 76; 29/90.01

(56) References Cited

U.S. PATENT DOCUMENTS

| | | | | |
|---|---|---|---|---|
| 3,195,220 A | * | 7/1965 | Martin ....................... 29/90.01 |
| 3,696,504 A | | 10/1972 | Cupler, II | |
| 4,398,407 A | * | 8/1983 | DeFay, Jr. ....................... 72/75 |
| 4,453,392 A | * | 6/1984 | Klubovich et al. ............. 72/75 |
| 4,771,627 A | * | 9/1988 | Speakman .................... 72/479 |
| 5,233,738 A | * | 8/1993 | Finkbeiner et al. ......... 29/90.01 |
| 5,247,766 A | | 9/1993 | Kildea | |
| 5,339,523 A | * | 8/1994 | Hasegawa ................ 29/898.02 |
| 5,501,892 A | | 3/1996 | Ohtsubo | |
| 5,644,394 A | | 7/1997 | Owens | |
| 5,826,453 A | * | 10/1998 | Prevey, III ....................... 72/75 |

FOREIGN PATENT DOCUMENTS

GB 1126020 9/1968

OTHER PUBLICATIONS

European Search Report dated Apr. 15, 2003, no translation.

* cited by examiner

*Primary Examiner*—Ed Tolan
(74) *Attorney, Agent, or Firm*—Burns, Doane, Swecker & Mathis, L.L.P.

(57) ABSTRACT

A method is disclosed for reducing the variance in the coolant consumption of components of a turbo-machine, in particular a gas turbine. The components are provided with one or more holes for the passage of a coolant, wherein a surface roughness existing inside the holes is reduced by mechanical finishing. The method is characterized by mechanical finishing that is performed by reshaping rough points that cause the surface roughness using a cold working process such as at least one of beating, pressing and rolling. The method permits a simple reduction of the surface roughness without creating finishing residues that could result in obstructions of the holes.

8 Claims, 2 Drawing Sheets

METHOD FOR REDUCING VARIANCE IN THE COOLANT CONSUMPTION OF COMPONENTS OF A TURBO-MACHINE

FIELD OF THE INVENTION

The present invention relates to a method for reducing the variance in the coolant consumption of components of a turbo-machine, in particular a gas turbine, having one or more through-holes or drilled holes for the passage of a coolant. The invention relates also to a tool for performing the method.

BACKGROUND OF THE INVENTION

Sufficient and reliable cooling of components of a turbo-machine is an essential aspect for operating the turbo-machine. Highly cooled components, such as, for example, turbine blades or combustor walls, are provided for this purpose with numerous cooling air holes, through which cooling air fed into the interior of the components passes and is released to the outside into the hot working medium.

The pressure to improve the efficiency of modern gas turbines results in the necessity of minimizing the cooling air consumption while maintaining sufficient cooling of the components to be cooled. A minimizing of the cooling air consumption is achieved, on the one hand, by an optimized distribution of the cooling air holes, and, on the other hand, by reducing the hole diameters while simultaneously increasing their number.

The holes are provided in the walls of the components to be cooled using modern manufacturing methods, such as, for example, laser drilling, laser cutting, electrochemical drilling, or spark erosion. However, these types of processing methods result in roughness of the surface inside the hole. The degree of roughness does not depend on the diameter of the hole, i.e., it is not reduced if the hole diameter is decreased. While the diameter of cooling air holes in stationary gas turbines was about 1 to 1.5 mm a few years ago, today's cooling air holes are provided in the components with diameters in the range of 0.6–0.8 mm or less. This means that the surface quality or roughness inside the hole increasingly determines the flow-through of the coolant. This influence becomes noticeable mainly in the case of deep holes, as required, for example, in the trailing edge of cooled turbine blades.

The roughness distribution in the holes occurs more or less randomly as they are produced. In particular, individual, fine rough points that may have a strong influence on the pressure loss across the hole, and therefore on the cooling air consumption, cannot be controlled, or can only be controlled insufficiently, by means of the known manufacturing processes. This random distribution of the rough points results in a wide variance of the cooling air consumption of the finished components, for example film-cooled turbine blades. In addition, the fine rough points occurring during the manufacturing of the cooling air holes change due to wear during operation of the components, so that the cooling air consumption of the components may rise over time in an undesirable manner.

These problems are dealt with during production in that the holes for the coolant that are produced using one of the above-mentioned production techniques are subsequently redrilled. This redrilling with a drill using diamond drill bits or other cutting techniques reduces the roughness, and thus the variance in the coolant consumption from component to component. For this purpose, the holes must be manufactured somewhat smaller initially, so that they will have the correct diameter following the removal of material as a result of the redrilling. However, one disadvantage of these known finishing techniques is that waste products, such as chips or grinding dust, are created by the cutting techniques. The techniques used in the past therefore caused both increased time expenditure for finishing the cooling air holes as well as the risk of soiling the components with the waste products created during the finishing. Such debris then may result in an obstruction of the cooling air holes during operation.

SUMMARY OF THE INVENTION

The present invention provides a method that reduces variance in the consumption of coolant by components of a turbo-machine, without the risk of later obstruction of the holes for the coolant by waste products.

The invention provides a method for reducing the variance in the coolant consumption of a turbo-machine, in particular a gas turbine, having one or more through-holes or drilled holes for the passage of a coolant. The method includes reducing the surface roughness present in the holes after manufacturing by a mechanical reshaping or cold working of rough points that cause the surface roughness. The holes are finished with a tool in such a way that the rough points are evened out by the reshaping. This eliminates especially fine rough points, so that a clearly reduced variance of the cooling air consumption, for example, from blade to blade of a gas turbine, can be achieved. The method is especially suitable for finishing cooling air holes in components of a gas turbine, for example the cooling air holes in the combustor walls or turbine blades of the gas turbine.

The reshaping of the rough points is preferably accomplished by a cold working process such as at least one of beating, pressing and rolling. Other similar shaping techniques can also be used for working out the rough points.

The inventors have recognized that the relatively small rough points occurring in the holes do not necessarily require a cutting technique in order to improve the surface quality. The leveling of the rough points with a simple mechanical reshaping, for example by a cold working process that includes at least one of beating, pressing and rolling, has significant advantages over cutting techniques. The mechanical reshaping methods of the present invention simplify the finishing, and, on the other hand, prevent the creation of chips or other waste particles that could contaminate the components on the inside. The present method advantageously enables finishing the finished component, for example, in its already installed state in the machine, for example, in the gas turbine. The holes can be produced with their final diameter during production, since, during finishing according to the invention, the rough points responsible for the variance in flow are only evened out, without enlarging the originally planned hole diameter.

The shaping of the rough points inside the holes is performed with a tool that neither cuts nor chips material that can be introduced into the hole manually or by machine. The tool has a pin-like shape so that, after being inserted into the cooling air hole, it extends at least over the entire length of the cooling air hole. It is then set into motion inside the hole by means of a suitable drive so as to act in a reshaping manner on the rough points. The movement of the pin-shaped tool generated by the drive may be rotating, translationally oscillating, or undulating. In principle, all types of movements can be used that cause the inner surface of the hole to interact with the pin-shaped tool that reshapes the rough points. In this way, the tool can be set into high-frequency oscillations, for example by means of ultrasound, in order to level the fine rough points inside the hole.

The shape of the tool also can be varied within a broad range. It is possible to use a pin-shaped tool that is cylindrical or conical or has a cross-section that is variable over its length. It is also possible to use a tool extending helically or in a wave shape along its longitudinal axis.

Preferably, the tool is provided with a drive that acts on the tool, in the case of a non-rotationally-symmetrical design, with a translationally oscillating movement in the direction of the longitudinal axis, and a rotating movement around the longitudinal axis. In the case of a tool body with a rotationally-symmetrical design, the drive is realized preferably so as to create a translationally oscillating movement in the direction of and transversely to the longitudinal axis.

BRIEF DESCRIPTION OF THE DRAWINGS

The method according to the invention is described below with the help of exemplary embodiments in reference to the drawings without restricting the general concept of the invention.

DETAILED DESCRIPTION OF THE PREFERRED EMBODIMENTS

Figure 1:
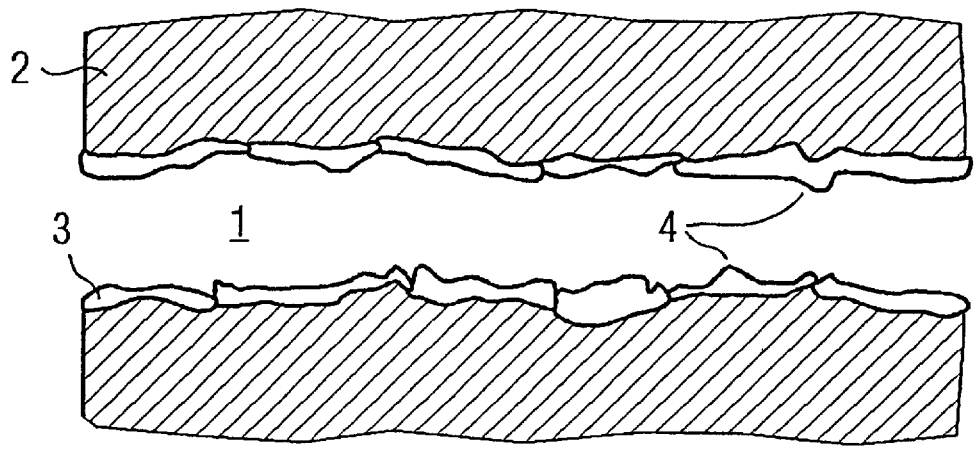
FIG. 1 shows an example of a cooling air hole of a component prior to finishing.

FIG. 1 is a schematic illustration of an example of the surface quality inside a cooling air hole of a gas turbine component. The cooling air hole 1 was placed into the wall 2 of the component using a suitable drilling method. As a result of the drilling methods used, fused-on layers 3 with numerous rough points 4 occur at the inside edge of the cooling air hole. The distribution and height of these rough points 4 vary from hole to hole. Especially in the small-diameter cooling air holes required today, these rough points significantly influence the flow of the coolant, and therefore of the coolant consumption.

In order to reduce the variance of the coolant consumption from hole to hole or from component to component, the rough spots 4 in the hole 1 are leveled or evened out in a reshaping manner using the present techniques. This finishing, which is only a reshaping—and not a cutting or chipping—prevents the creation of chips or other waste products that could result in an obstruction of the cooling air holes during later operation. However, the leveling of the rough points nevertheless results in a significant decrease in variance of the coolant flow from hole to hole or from component to component.

Figure 2:
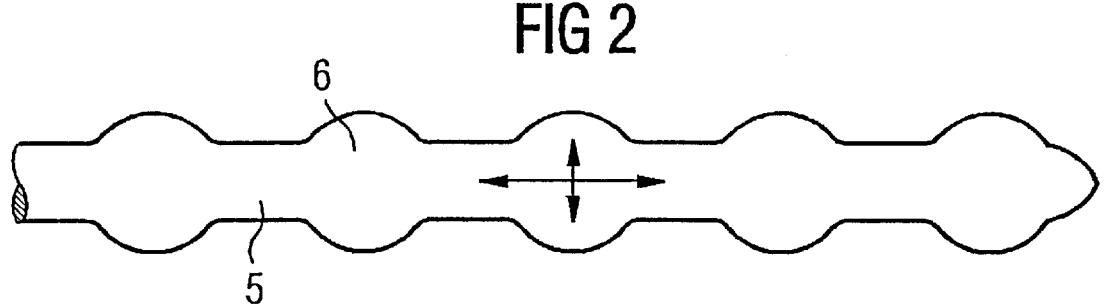
FIG. 2 shows a first example for a tool for finishing according to the invention.

FIG. 2 shows an example for a tool for performing the method at hand. The tool includes a pin-shaped tool body 5 that in this example is constructed along its longitudinal axis with a variable cross-section. The pin-shaped tool body 5 is coupled with a corresponding drive (not shown) that drives the pin so as to perform an oscillating translation movement along its longitudinal axis as well as transversely to its longitudinal axis (indicated by arrows). The variable cross-section of the pin-shaped tool body 5 is realized in this example by ball-like enlargements 6 occurring at regular intervals along the longitudinal axis of the tool body 5. The oscillating movement of the tool body 5 (indicated by the arrows) in a cooling air hole 1, such as illustrated in FIG. 1, causes the rough points 4 to be reshaped by a beating movement or to be pressed smooth.

The material of the pin-shaped tool body 5 should have at least the same hardness as the material to be leveled. The tool body may be metallic or ceramic, or may also include another material that, for example, also may be coated with a hard layer. The diameter of the tool body should be smaller than the diameter of the cooling air holes. Preferably, such a tool body should therefore have a diameter of 0.5 mm or less.

Figure 3:
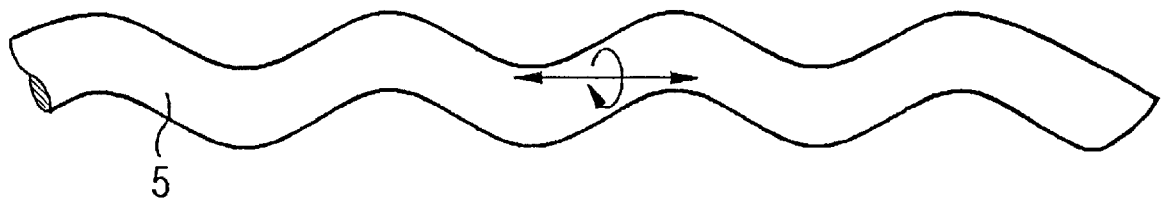
FIG. 3 shows a second example for a tool for finishing according to the invention.

FIG. 3 shows another example of the shape of a pin-shaped tool body 5 for use in the method according to the invention. In this example, the pin-shaped tool 5 is constructed in a wave shape or provided with an undulating profile. The drive (not shown) drives this pin 5 in the cooling air hole so as to perform a rotating movement around its longitudinal axis as well as a translational movement along its longitudinal axis, as illustrated by the arrows. Such a design again achieves the same leveling effect on the rough points 4 as can be achieved with the tool body of FIG. 2.

The wave-shaped geometry of the tool body 5 in FIG. 3 preferably is realized with a screw-shaped or helical geometry of this body, but may be present also only in a single plane.

Figure 4A:
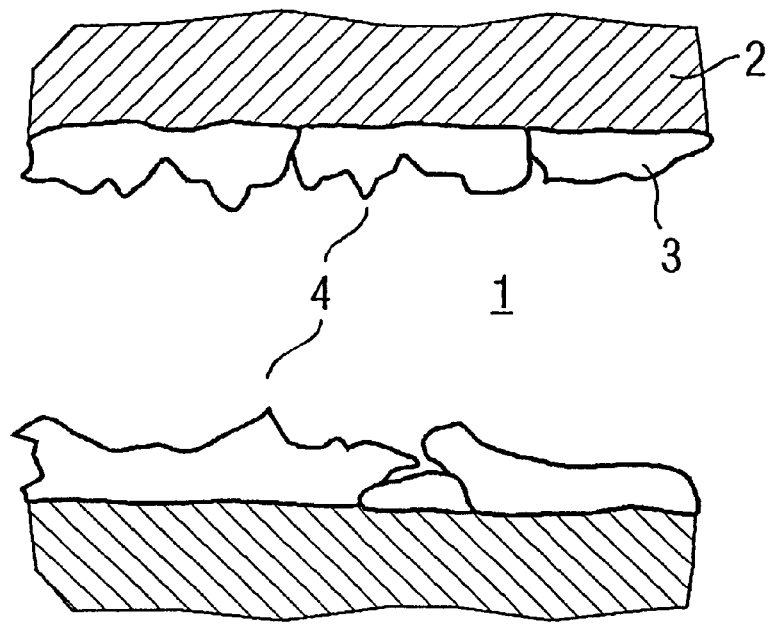
FIG. 4a shows a section of a cooling air hole prior to finishing.
Figure 4B:
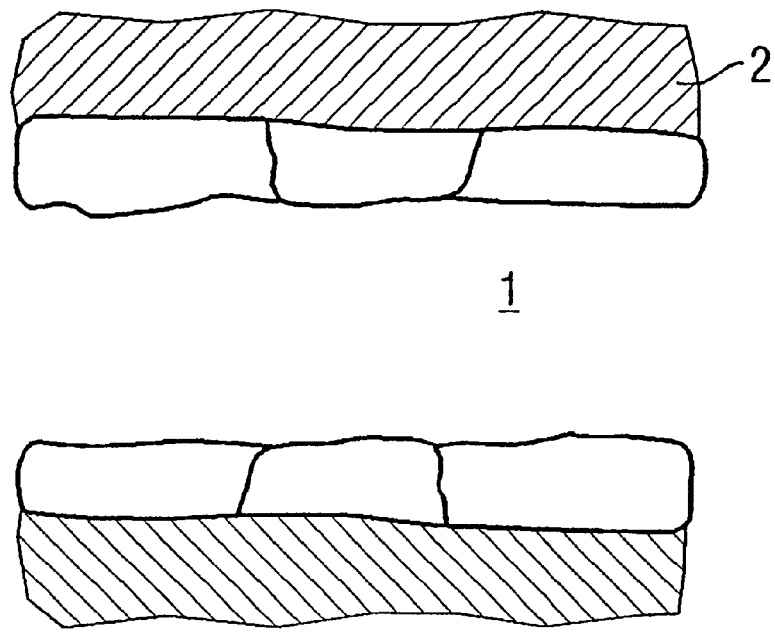
FIG. 4b shows a section of a cooling air hole after finishing.

FIGS. 4a and 4b finally represent a schematic illustration of a section of a cooling air hole 1 such as the one in FIG. 1 prior to and after the finishing using the method at hand. FIG. 4a illustrates the still very rough, inner surface of the cooling air hole 1 with numerous rough points 4.

Following the finishing with the method according to the invention, the rough points 4 are leveled so that a clearly smoothed, inner surface of the cooling air hole 1 exists (FIG. 4b).

What is claimed is:

1. A method for reducing variance in the coolant consumption of components of a turbo machine, wherein said components include one or more holes for the passage of a coolant, said method comprising:
   reducing a surface roughness present inside the holes by mechanical finishing, the mechanical finishing being performed by reshaping rough points that cause the surface roughness,
   wherein said reshaping is performed with an approximately pin-shaped tool, said approximately pin-shaped tool having one of a rotationally-symmetrical design or a non-rotationally-symmetrical design, and said tool being inserted manually or by machine into a hole and moved inside the hole in order to level the rough points,
   said reshaping being performed in the case of a tool having a non-rotationally-symmetrical design with a translationally oscillating movement in the direction of the longitudinal axis and a rotating movement around the longitudinal axis, and in the case of a tool having a rotationally-symmetrical design with a translationally oscillating movement in the direction of the longitudinal axis and a translationally oscillating movement transversely to the longitudinal axis.

2. The method as claimed in claim 1, wherein the reshaping is performed by at least one of beating, pressing and rolling.

3. The method as claimed in claim 1, wherein the pin-shaped tool is set by ultrasound coupling to perform high-frequency oscillations inside the hole.

4. The method as claimed in claims 3, wherein the pin-shaped tool is constructed with a cylindrical, conical, or variable cross-section.

5. The method as claimed in claim 3, wherein the pin-shaped tool extends in a wave-shape along its longitudinal axis.

6. The method as claimed in claim 3, wherein the pin-shaped tool is provided with elevations on its outer surface.

7. A component of a turbo-machine, comprising:
   one or more holes for the passage of a coolant, said holes being finished using the method according to one of claim 1 or 2.

8. A tool for reducing variance in the coolant consumption of components of a turbo machine, wherein said components include one or more holes for the passage of a coolant, said tool comprising:

a tool body with a drive, said tool body being approximately pin-shaped, said tool body having one of a rotationally-symmetrical design or a non-rotationally-symmetrical design, and said tool body being inserted manually or by machine into a hole and moved inside the hole in order to level rough points inside the hole, and the drive being adapted to act on the tool body with at least one of a translationally oscillating movement in the direction of the longitudinal axis and a rotating movement around the longitudinal axis in the case of a non-rotationally-symmetrical tool body, and a translationally oscillating movement in the direction of and transversely to the longitudinal axis in the case of a rotationally-symmetrical tool body.

* * * * *